United States Patent [19]
McCone, Jr.

[11] 3,962,865
[45] June 15, 1976

[54] ROCKET MOTOR CONSTRUCTION

[75] Inventor: Alan I. McCone, Jr., San Francisco, Calif.

[73] Assignee: MB Associates, San Ramon, Calif.

[22] Filed: Nov. 16, 1973

[21] Appl. No.: 416,639

Related U.S. Application Data

[63] Continuation of Ser. No. 276,731, July 31, 1972, abandoned.

[52] U.S. Cl. ................................ 60/255; 102/100
[51] Int. Cl.² .......................................... F02K 9/04
[58] Field of Search .............. 60/253, 255; 102/49.3

[56] References Cited
UNITED STATES PATENTS

| | | | |
|---|---|---|---|
| 683,106 | 9/1901 | Du Buit | 102/100 |
| 2,488,154 | 11/1949 | Africano | 60/255 |
| 3,176,618 | 4/1965 | Forsberg et al. | 60/253 |

*Primary Examiner*—Samuel Feinberg
*Attorney, Agent, or Firm*—Harness, Dickey & Pierce

[57] ABSTRACT

A rocket motor construction wherein a convolutely wound propellent strip forms a fuel grain disposed within the rocket motor casing. The fuel grain consists essentially of double base propellant having a plateau or mesa burn characteristic and is shaped to provide a plurality of rearwardly extending blades connected to a convolutely wound margin of the strip. The blades cooperate with each other and with the rocket motor casing to define flow channels between angularly adjacent blades and between adjacent convolutions thereby providing flow channels for combustion product.

5 Claims, 11 Drawing Figures

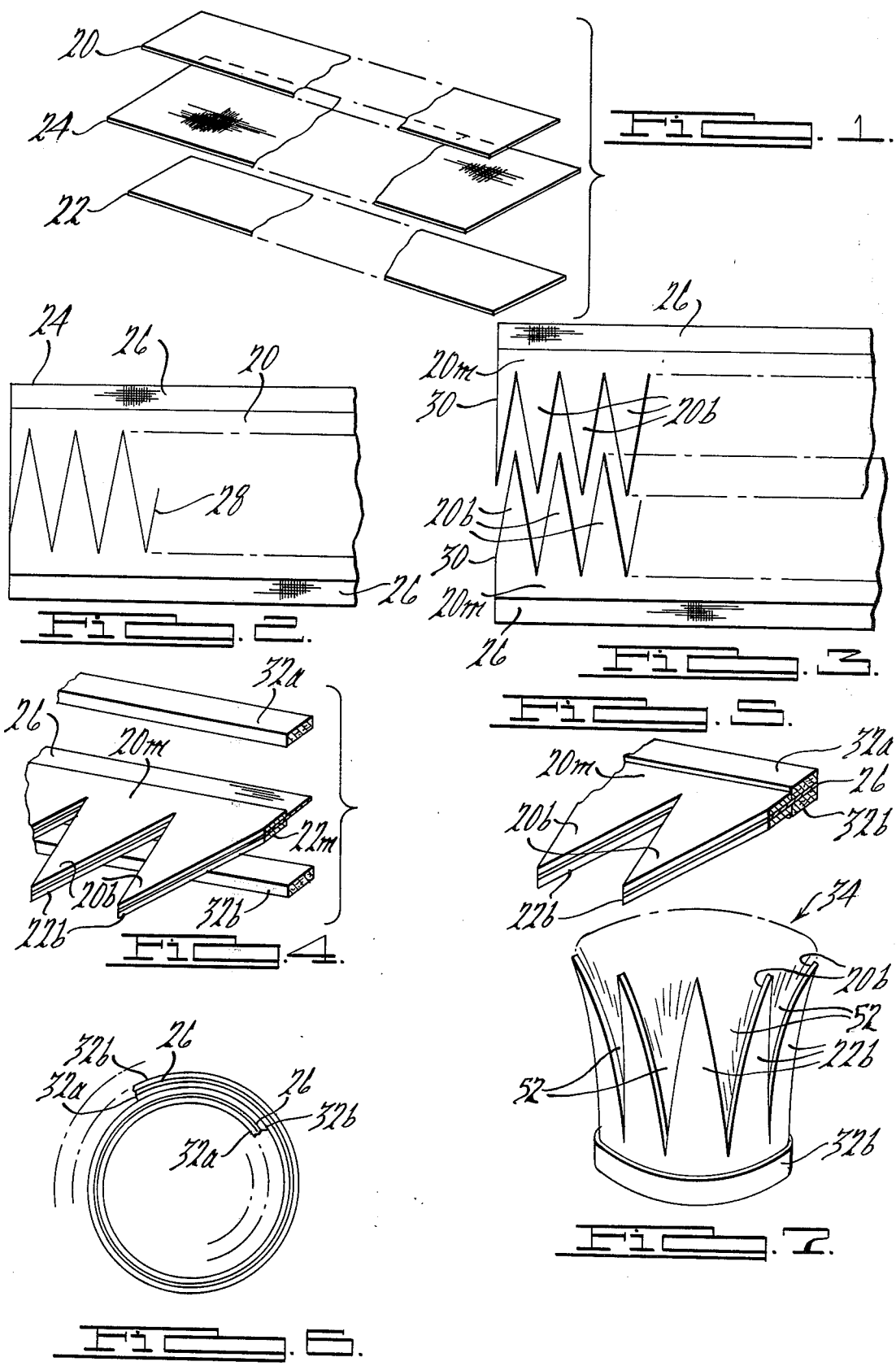

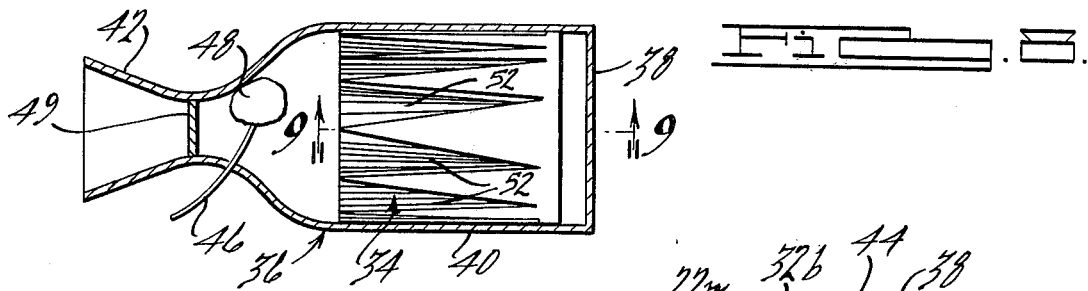
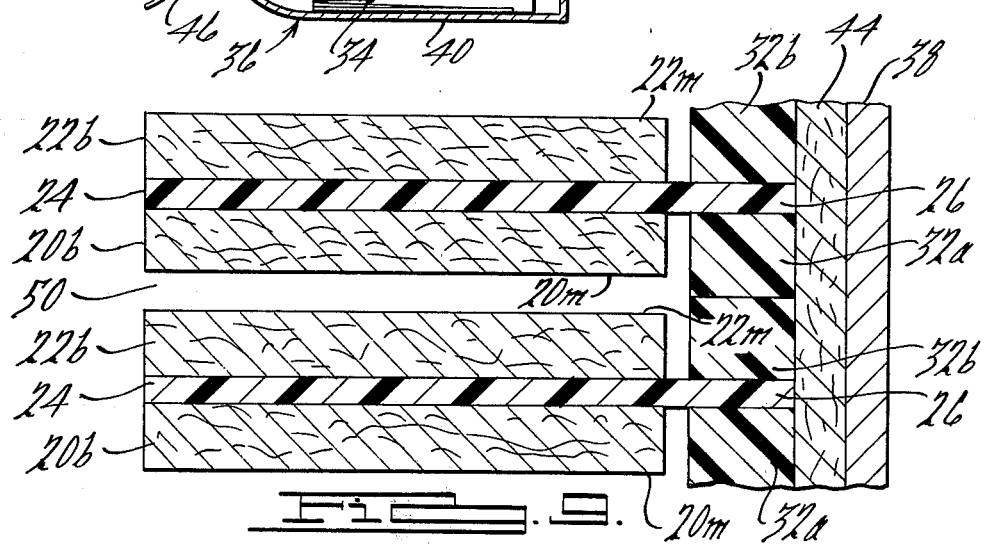
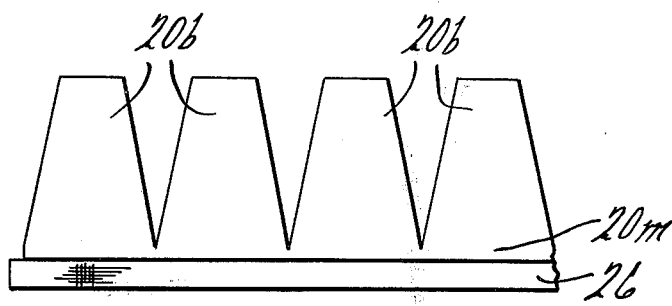
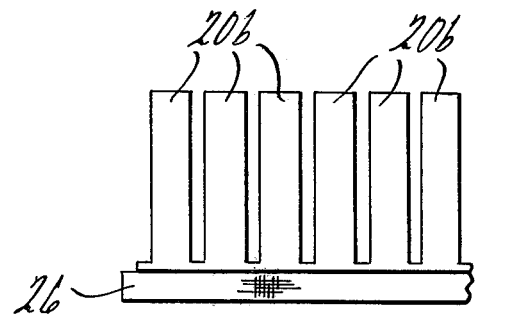

ROCKET MOTOR CONSTRUCTION

This is a continuation of application Ser. No. 276,731, filed July 31, 1972 and now abandoned.

BACKGROUND AND SUMMARY OF THE INVENTION

The present invention relates to a fuel grain for a rocket motor.

Heretofore, a serious problem sometimes referred to as "errosive burning" or "ignition shock" has plagued attempts to use double base propellant fuel grains in small high-G rocket motors. Generally speaking, the problem arises in attempts to optimize the fuel mass and involves the generation of high internal pressures relatively early in the propellant burn. Due to this problem, the fuel grain has a tendency to blow up rather than to burn in the desired fashion.

Accordingly, the principal object of the present invention is to provide a fuel grain which solves this problem. Additional objects, advantages and benefits of the invention will be seen in the ensuing description which is to be taken in conjunction with the accompanying drawings.

BRIEF DESCRIPTION OF THE DRAWINGS

The drawings illustrate preferred embodiments of the invention in accordance with the best mode presently contemplated for carrying out the invention.

FIGS. 1–6 illustrate a method of making a fuel grain according to the present invention.

FIG. 7 illustrates the fuel grain made in accordance with the method of FIGS. 1–6.

FIG. 8 shows the fuel grain of FIG. 7 in a rocket motor casing.

FIG. 9 is an enlarged fragmentary sectional view taken along line 9—9 in FIG. 8.

FIG. 10 illustrates a modified form of the invention.

FIG. 11 illustrates a further modified form of the invention.

DESCRIPTION OF THE PREFERRED EMBODIMENTS

In the method shown in FIGS. 1–6, identical strips 20 and 22 of double base propellant are bonded to opposite sides of a supporting strip 24 of glass fiber cloth by a suitable adhesive such as acetone (FIG. 1). (It will be appreciated that in describing the preferred embodiments of the invention, the term double base propellant refers to a solid fuel consisting primarily of nitrocellulose and nitroglycerin and which has a plateau or mesa burning characteristic.) The width of support strip 24 is somewhat greater than the widths of propellant strips 20 and 22 so that when the three strips, 20, 22 and 24 are laterally centered, the side margins 26 of support strip 24 protrude beyond the side edges of propellant strips 20 and 22. The bonded strips are next cut lengthwise in zigzag fashion along the cut line 28 into two substantially identical complementary strips 30 (FIGS. 2 and 3) each of which is to become a fuel grain. The zigzag cut leaves margins 20m and 22m of propellant strips 20 and 22 respectively to which a plurality of triangularly shaped blades 20b and 22b respectively are connected. The blades 20b and 22b are all identical (except for possibly the end blades), and in the illustrated embodiment each blade 20b, 22b is in the shape of an isosceles triangle with the base thereof connected to its margin 20m, 22m and the apex thereof spaced from its margin 20m, 22m.

Spacing tapes 32a and 32b are bonded to opposite sides of margin 26 of one of strips 30, (FIGS. 4 and 5). Each tape 32a, 32b has a width preferably equal to or slightly less than the width of margin 26 and a thickness which is greater than the thickness of its adjacent propellant strip 20, 22. After spacing tapes 32a and 32b have been bonded to margin 26, the composite strip is rolled up lengthwise such that each succeeding convolution of tape 32a is in contact with the immediately preceding convolution of tape 32b (FIG. 6). The rolled up strip is illustrated in FIG. 7 and forms a fuel grain 34. When grain 34 is stood on its rolled-up end as in FIG. 7, the blades have a tendency to bend slightly and hence, the grain bears somewhat of a resemblance to an artichoke.

FIGS. 8 and 9 illustrate fuel grain 34 in a rocket motor casing 36. Casing 36 comprises a forward end closure 38, a side closure 40 and a nozzle 42. The rolled up end of grain 34 has a generally flat circular surface suitable for bonding to the interior of forward closure 38 by means of a suitable bonding layer 44. With propellant strips 20 and 22 bonded to support strip 24, and fuel grain 34, in turn, bonded to forward closure 38, the propellant is securely anchored within casing 36. Such anchoring is necessary because the propellant strips are unable to support themselves during burning and would otherwise likely blast out of casing 36 when ignited. Fuel grain 34 may be ignited in conventional fashion by means of an igniter wire 46 and a charge igniter powder 48 within casing 36. Preferably, nozzle 42 is closed by a breakable seal 49 which opens when the internal pressure within casing 36 reaches a preselected level after grain 34 has been ignited.

As best seen in FIG. 9, successive convolutions of grain 34 are separated by a convolute flow channel 50 through which the propellant combustion products can flow to nozzle 42. The thickness of flow channel 50 is equal to the sum of the thicknesses of spacing tapes 32a and 32b less the sum of the thicknesses of propellant strips 20 and 22, and it will be appreciated that this thickness can be varied by varying the thickness of tapes 32a, 32b and/or the thicknesses of propellant strips 20 and 22.

Pursuant to the invention, it will be observed that flow channel 50 is supplemented by triangularly shaped flow channels 52 provided between angularly adjacent blades. Propellant combustion products can also flow through channels 52 to nozzle 42. The area of each flow channel 52 increases toward nozzle 42 so that the available area through which propellant combustion products can flow increases toward nozzle 42. While the dimensions of fuel blades 20b and 22b in relation to the dimensions of flow channels 50 and 52 will depend upon the particular requirements of the motor in which the fuel grain is to be used, it is believed that there is a certain relationship which must be satisfied for the propellant to burn in the desired fashion. Since the difficulty, and perhaps impossibility, of ascertaining the precise nature of the various phenomena occurring within the motor during firing will be readily appreciated, it is likely that a precise formulation of this relationship will be difficult, or impossible, to derive. However, it is presently believed that one way of approximately expressing this relationship for a given size and shape of cut propellant strip is in terms of the ratio of fuel surface area to the port area (i.e. transverse cross sectional area) of flow channels 50 and 52. If this ratio is too large, the fuel grain may have a tendency to blow up and hence, this ratio must not be exceeded if the fuel grain is to burn in the desired fashion.

FIGS. 10 and 11 illustrate further embodiments of the invention. In FIG. 10 which shows an unwound strip, blades 20b and 22b are in the shape of isosceles trapezoids with the longer base of each trapezoid connected to its margin 20m and 22m. In FIG. 11 which shows an unwound strip, blades 20b and 22b are rectangular in shape.

While it will be apparent that the invention herein disclosed is well calculated to achieve the benefits and advantages as hereinabove set forth, it will be appreciated that the invention is susceptible to modification, variation and change without departing from the spirit thereof.

I claim:

1. In a rocket motor, a motor casing having a cylindrical side wall, a flat front wall and a nozzle at the rear thereof, a fuel grain within said closure having a central supporting strip, a pair of propellant strips, means adherring said propellant strips to opposite sides of said supporting strip, one edge of said strips being undulated, the other edge of said central supporting strip being extended beyond the propellant strips, and tapes of greater thickness than said propellant strips secured to the surfaces of said extended edge of said supporting strip so that when rolled up and slid within the casing, spaces will be provided between the propellant in each convolution as well as those between the undulations providing axial burning of said propellant.

2. In a rocket motor as recited in claim 1, wherein the propellant strips are of less width than the supporting strip so as to provide a marginal edge each side of the supporting strip, the central portion of the combined strips being severed along an undulated line to provide projections on one edge of the resulting pair of strips.

3. In a rocket motor as recited in claim 1, wherein the pair of tapes are greater in thickness than the pair of propellant strips to thereby regulate the space between the propellant strips to provide flow channels.

4. In a rocket motor as recited in claim 2, wherein a pair of tapes are adherred to the opposite surfaces of each said side marginal edge of said supporting strip.

5. In a rocket motor as recited in claim 4 wherein each said severed strip is of like construction, and said supporting strip is of glass fibre cloth.

* * * * *